United States Patent
Sauder et al.

(10) Patent No.: US 10,548,254 B2
(45) Date of Patent: Feb. 4, 2020

(54) LOAD SENSING PIN FOR AN AGRICULTURAL IMPLEMENT

(71) Applicant: Precision Planting LLC, Tremont, IL (US)

(72) Inventors: Gregg A. Sauder, Tremont, IL (US); Derek A. Sauder, Tremont, IL (US); Justin Koch, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 81 days.

(21) Appl. No.: 15/155,429

(22) Filed: May 16, 2016

(65) Prior Publication Data

US 2016/0255760 A1    Sep. 8, 2016

Related U.S. Application Data

(63) Continuation of application No. 14/047,372, filed on Oct. 7, 2013, now Pat. No. 9,338,937, which is a
(Continued)

(51) Int. Cl.
  *G01L 5/00* (2006.01)
  *A01B 63/00* (2006.01)
(Continued)

(52) U.S. Cl.
  CPC .......... *A01B 63/008* (2013.01); *A01B 49/027* (2013.01); *A01C 5/064* (2013.01);
(Continued)

(58) Field of Classification Search
  CPC ....... G01L 1/00; G01L 1/2218; G01L 5/0038; G01L 5/136; A01B 63/00; A01B 49/027;
(Continued)

(56) References Cited

U.S. PATENT DOCUMENTS

| | | | |
|---|---|---|---|
| 3,749,035 A | * | 7/1973 | Cayton .................. A01C 7/205 111/137 |
| 4,009,668 A | | 3/1977 | Brass et al. |

(Continued)

FOREIGN PATENT DOCUMENTS

EP    0372901 B1    2/1994

OTHER PUBLICATIONS

ME280 Senior Design; Row Unit Downforce Measurement System; Andrew Dochterman, Doug States, and David Tallon; 3D Consulting; pp. 1-24.
(Continued)

*Primary Examiner* — Octavia Hollington
(74) *Attorney, Agent, or Firm* — Thomas J. Oppold; Larkin Hoffman Daly & Lindgren, Ltd.

(57) ABSTRACT

A load sensing pin disposed to receive a load applied in a direction substantially transverse to a longitudinal axis of the pin. A load sensor is substantially fixedly oriented with respect to the applied load or alternatively with respect to the pin which is rotationally restrained with respect to a support structure. The load sensor is disposed to generate a load signal corresponding to strain of the pin resulting from the applied load.

14 Claims, 15 Drawing Sheets

Related U.S. Application Data continuation of application No. 12/522,253, filed as application No. PCT/US2008/050401 on Jan. 7, 2008, now Pat. No. 8,561,472.

(60) Provisional application No. 60/883,957, filed on Jan. 8, 2007, provisional application No. 60/953,983, filed on Aug. 3, 2007.

(51) Int. Cl.

| | | |
|---|---|---|
| *A01C 7/20* | (2006.01) | |
| *G01L 1/22* | (2006.01) | |
| *G01L 5/13* | (2006.01) | |
| *A01B 49/02* | (2006.01) | |
| *A01C 5/06* | (2006.01) | |
| *A01C 7/08* | (2006.01) | |
| *G05B 19/402* | (2006.01) | |

(52) U.S. Cl.
CPC ................ *A01C 7/08* (2013.01); *A01C 7/205* (2013.01); *G01L 1/2218* (2013.01); *G01L 5/0038* (2013.01); *G01L 5/136* (2013.01); *G05B 19/402* (2013.01); *G05B 2219/45017* (2013.01)

(58) Field of Classification Search
CPC .. A01C 5/064; A01C 7/08; A01C 7/20; G05B 19/402; G01B 5/30
USPC .................................................. 73/760, 761
See application file for complete search history.

(56) References Cited

U.S. PATENT DOCUMENTS

| | | | |
|---|---|---|---|
| 4,162,628 A | 7/1979 | Oetjen et al. | |
| 4,207,823 A | 6/1980 | Steilen et al. | |
| 4,430,952 A | 2/1984 | Murray | |
| 4,522,066 A | 6/1985 | Kistler et al. | |
| 4,594,951 A | 6/1986 | Grataloup | |
| 4,858,475 A | 8/1989 | Jacobson et al. | |
| 5,074,227 A | 12/1991 | Schwitters | |
| 5,160,055 A | 11/1992 | Gray | |
| 5,235,922 A | 8/1993 | Deckler | |
| 5,309,700 A | 5/1994 | Winkels | |
| 5,538,085 A | 7/1996 | Lowe et al. | |
| 6,148,747 A | 11/2000 | Deckler et al. | |
| 6,389,999 B1 | 5/2002 | Duello | |
| 6,497,153 B1 | 12/2002 | Hoskinson et al. | |
| 6,701,857 B1 | 3/2004 | Jensen et al. | |
| 6,827,029 B1 | 12/2004 | Wendte | |
| 6,848,377 B2 | 2/2005 | Rylander et al. | |
| 7,308,859 B2 | 12/2007 | Wendte et al. | |
| 7,360,495 B1 * | 4/2008 | Martin ................. | A01C 7/203 111/164 |
| 8,078,367 B2 | 12/2011 | Sauder et al. | |
| 8,561,472 B2 * | 10/2013 | Sauder ................. | A01C 7/205 73/760 |
| 8,738,243 B2 * | 5/2014 | Sauder ................. | A01B 79/005 111/200 |
| 9,338,937 B2 * | 5/2016 | Sauder ................. | A01C 7/205 |

OTHER PUBLICATIONS

International Search Report, dated Jun. 25, 2008, p. 1.

* cited by examiner

LOAD SENSING PIN FOR AN AGRICULTURAL IMPLEMENT

BACKGROUND

When planting with a conventional row-crop planter such as a John Deere MaxEmerge® or MaxEmerge® Plus planter, it is recognized that sufficient down force must be exerted on the row unit to ensure full penetration of the furrow opening disk blades into the soil to the pre-selected furrow depth and also to provide some degree of soil compaction by the gauge wheels to ensure proper furrow formation. It is also recognized, however, that excessive down force will cause over compaction of the soil which may, in turn, result in improper root growth and/or poor germination due to re-opening of the furrow.

FIGS. 1, 4 and 7 are intended to represent soil profiles under the furrow opening assembly 34 of a conventional planter that is subject to differing amounts of down force. Specifically, FIG. 1 illustrates a soil profile with an ideal amount of down force being exerted so as to achieve full penetration to the preset depth of the disk blades 44, 46 and with just enough compaction exerted on the surrounding soil by the gauge wheels 48, 50 to ensure proper furrow formation but without excess soil compaction of the surrounding soil. FIG. 2 represents the same soil profile after the seed 42 is deposited but prior to being covered with soil by the furrow closing assembly 36. FIG. 3 is intended to represent that same soil profile after being covered with soil by the furrow closing assembly 36.

FIGS. 4-6 are similar to FIGS. 1-3 but are intended to represent the effects of too little down force being exerted by the gauge wheels 48, 50. In such a situation, the disk blades 44, 46 may not penetrate into the soil to the full desired depth and/or the soil may collapse into the furrow 38 as the seeds 42 are being deposited resulting in irregular seed depth.

FIGS. 7-9 are also similar to FIGS. 1-3 but represent the effects of excessive down force being applied. The soil is being compacted excessively adjacent to the seed furrow 38 resulting in substantial differences in soil density between the furrow walls when compared to the soil density on either side of the furrow. Under such extreme conditions, the compaction of the furrow walls and the soil below the furrow 38 prevents the roots from easily penetrating the adjacent soil, which may result in the roots being prevented from growing conically downward perpendicular to the direction of the furrow. Poor root penetration may result in weak stands and may place the crops under unnecessary stress during drier conditions. In addition to inadequate root penetration, as illustrated in FIG. 9, when the soil is overly compacted by the gauge wheels, the furrow may re-open along the centerline of the furrow due to the differing soil densities as the soil dries out, resulting in poor seed-to-soil contact and/or drying out of the seed causing poor germination and seedling death.

Heretofore, growers could only speculate as to whether the amount of downforce set for the planter was appropriate by observing the soil profile after planting a stretch of soil to determine the looseness or compactness of the soil around the seed furrow. Simply visually inspecting the soil is imprecise and it is difficult for most growers to accurately judge whether or not they are planting with too little or too great of downforce. Furthermore, the appropriate amount of downforce to be applied may be different across the field due to varying soil conditions.

U.S. Pat. No. 6,389,999 to Duello (hereinafter "Duello '999) describes a system for dynamically controlling excess downforce during planting operations by employing a pressure sensor, such as a strain gauge or other pressure transducer, placed on or incorporated into the gauge wheel mounting structure to detect the compressive forces being exerted upon the gauge wheel mounting structure. Duello '999 further describes the use of a microprocessor, or the like, adapted to receive the signals from the pressure sensor and to actuate the planter's hydraulic system or a supplemental down-pressure system to regulate the amount of down force exerted on the planter row units in relation to a value previously selected by the grower. Duello '999 further discloses that the pre-selected down force value may be variable based on pre-selected values entered into field mapping system utilizing global positioning.

U.S. Pat. No. 6,701,857 to Jensen et al. (hereinafter "Jensen '857") also discloses a system for automatically adjusting the downforce during planting operations. Specifically, Jensen '857 discloses the use of a Wheatstone bridge strain gage circuit applied to the gauge wheel arms to detect the amount of strain due to bending stresses exerted on the arms. The strain exerted on the gauge wheel arms corresponds to the change in resistance or output voltage of the Wheatstone bridge circuit. The output voltage is transmitted to a closed loop electronic control unit connected to the electrical and hydraulic or pneumatic system of the tractor used for regulating the downforce applied by the planter. A micro-processor functions to compare the detected downforce to a downforce value pre-selected by the grower and to automatically actuate the planter's hydraulic or pneumatic system accordingly to increase or decrease the downforce as required to maintain the detected downforce at or near the pre-selected downforce value. Jensen also proposes the concept of measuring a shear load at a pin in the depth control mechanism but fails to provide any discussion or drawing figures on how to do so.

While the foregoing patents describe the benefit of being able to monitor and control downforce during planting operations and the general theory of utilizing a pressure sensor in the "gauge wheel mounting structure" (Duello '999) or on the "gauge wheel arms" (Jensen '857) neither patent describes in sufficient detail a practical working embodiment that can accurately and consistently determine and monitor down force during planting operations. For example, changes in the depth setting of the planter unit can result in a different loading conditions on the gauge wheel arms and gauge wheel mounting structure which can vary the output signal of the pressure sensor. Additionally, due to the location, the sensitive gauges and wires used for monitoring the downforce must be shielded or protected to avoid damage from debris during planting operations.

Accordingly, there remains a need for a system for monitoring downforce on a planter row unit that is robust yet economical to produce and that provides accurate measurements (preferably without calibration) regardless of the position of the depth regulation member.

DETAILED DESCRIPTION

Figure 10:
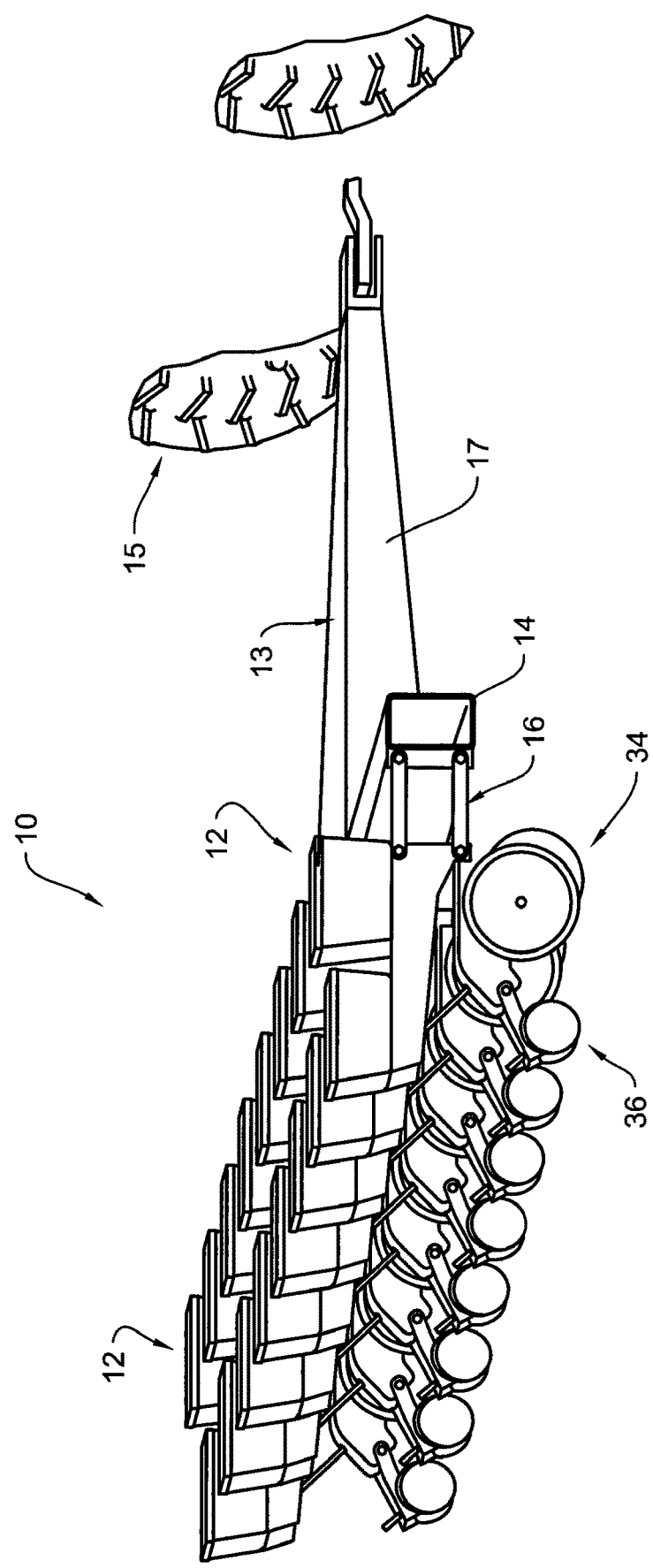
FIG. 10 is a perspective view of conventional row crop planter.
Figure 18:
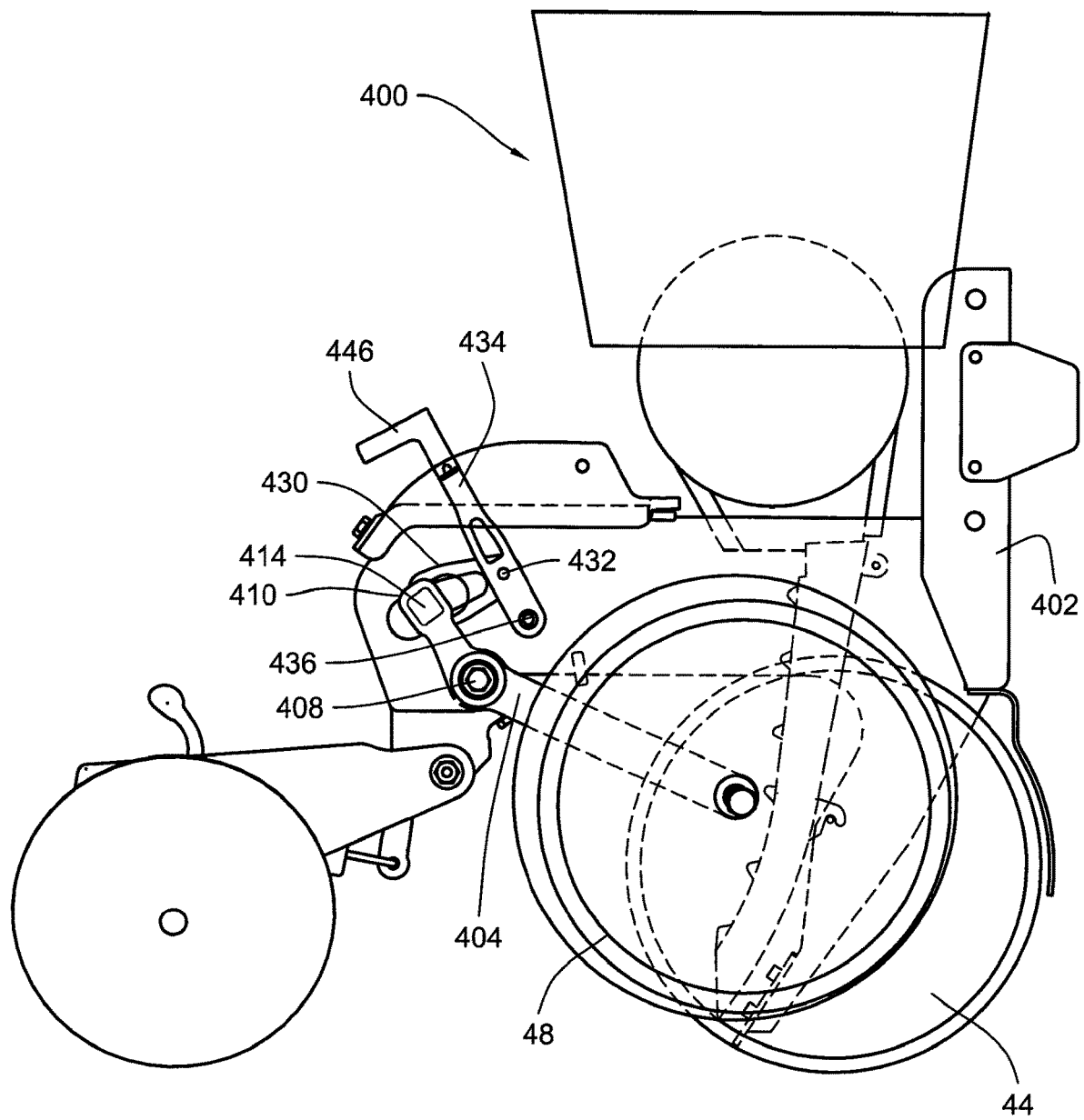
FIG. 18 is a side elevation drawing of another type of conventional depth adjustment mechanism for a row unit of a conventional row crop planter.

Referring now to the drawings, wherein like reference numerals designate identical or corresponding parts throughout the several views, FIG. 10 illustrates a conventional row-crop planter 10, such as the type disclosed in U.S. Pat. No. 4,009,668, incorporated herein in its entirety by reference, and/or as embodied in commercially available planters such as the John Deere MaxEmerge or MaxEmerge Plus planters. FIG. 18 illustrates yet another conventional commercially available row-crop planter such as the Kinze Evolution series planter. It should be appreciated that although reference is made throughout this specification to particular makes and models of planters, such references are examples only, made to provide context and a frame of reference for the subject matter discussed. As such, the present invention should not be construed as being limited to any particular make(s) or model(s) of planter.

The planter 10 includes a plurality of spaced row-units 12 supported along a transversely disposed toolbar 14 comprising a part of the planter main frame 13. The planter main frame 13 attaches to a tractor 15 in a conventional manner, such as by a drawbar 17 or three-point hitch arrangement as is well known in the art. Ground wheel assemblies (not shown) support the main frame 13 above the ground surface and are moveable relative to the main frame 13 through actuation of the planter's hydraulic system (not shown) coupled to the tractor's hydraulics to raise and lower the planter main frame 13 between a transport position and a planting position, respectively.

Figure 11:
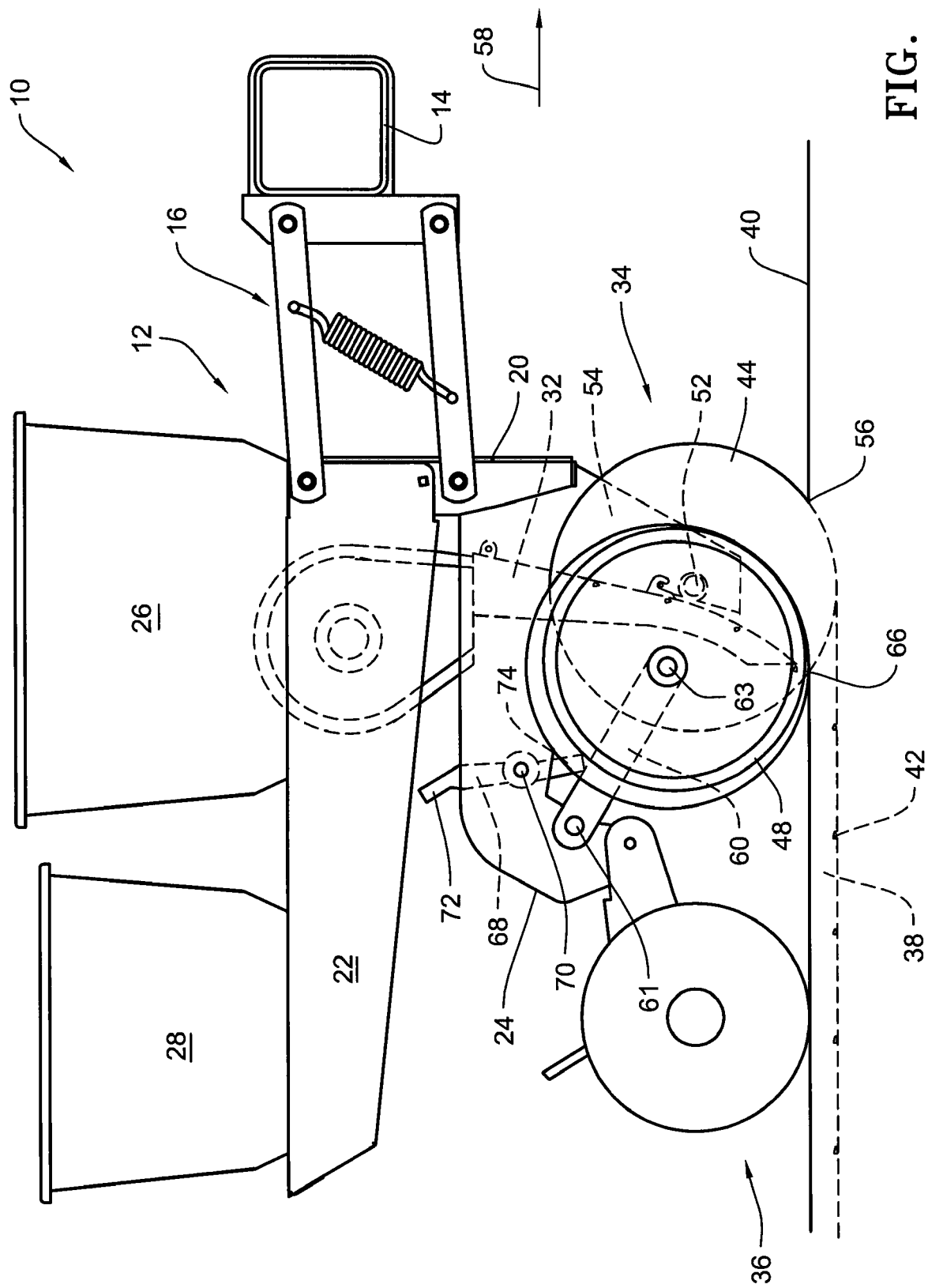
FIG. 11 is a side elevation view of a row unit of the conventional row crop planter of FIG. 10.

As best illustrated in FIG. 11, each row unit 12 is supported from the toolbar by a parallel linkage 16 which permits each row unit 12 to move vertically independently of the toolbar 14 and the other spaced row units in order to accommodate changes in terrain or upon the row unit encountering a rock or other obstruction as the planter is drawn through the field. Biasing means 18, such as springs, air-bags, etc., extend between the parallel linkage 16 to provide supplemental or additional downforce on the row unit. Each row unit 12 includes a front mounting bracket 20 to which is mounted a hopper support beam 22 and a subframe 24. The hopper support beam 22 supports a seed hopper 26 and a fertilizer hopper 28 as well as operably supporting the seed meter 30 and seed tube 32. The subframe 24 supports a furrow opening assembly 34 and a furrow closing assembly 36.

In operation, the furrow opening assembly cuts a V-shaped furrow 38 (FIGS. 1 and 11) into the soil surface 40 as the planter is drawn through the field. The seed hopper 26, which holds the seeds to be planted, communicates a constant supply of seeds 42 to the seed meter 30. The seed meter 30 of each row unit 12 is typically coupled to the ground wheels through use of shafts, chains, sprockets, transfer cases, etc., as is well known in the art, such that individual seeds 42 are metered and discharged into the seed tube 32 are regularly spaced intervals based on the seed population desired and the speed at which the planter is drawn through the field. The seed 42 drops from the end of the seed tube 32 into the V-shaped furrow 38 and the seeds 42 are covered with soil by the closing wheel assembly 36.

Figure 1:
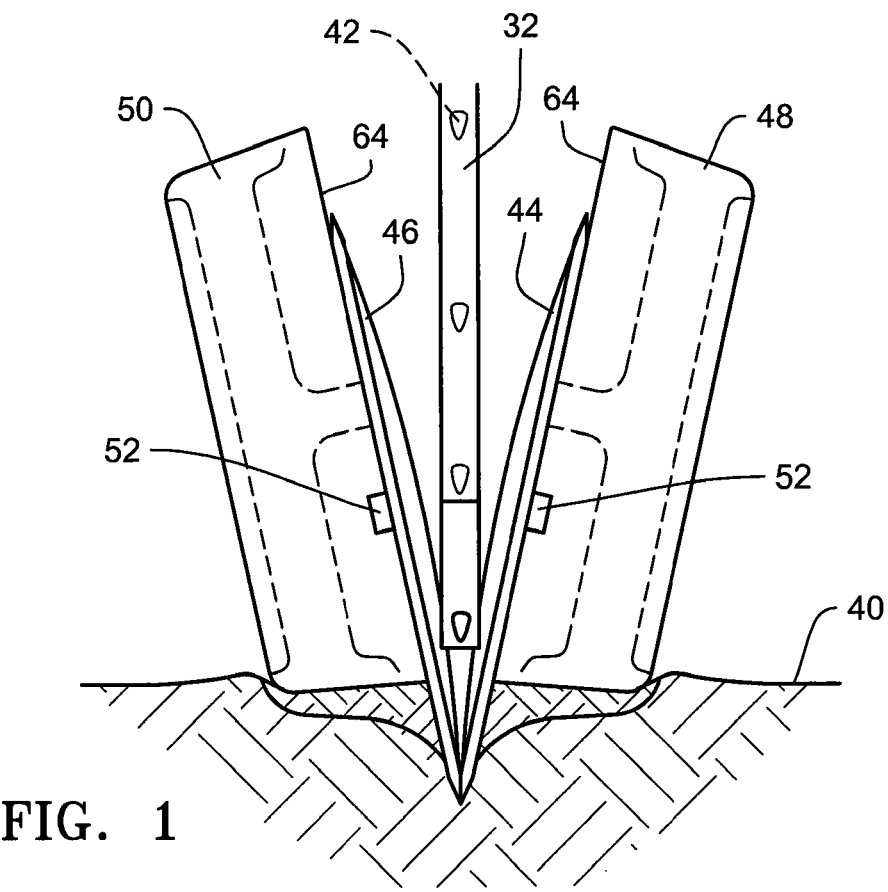
FIG. 1 represents a soil profile under a furrow opening assembly of a conventional row crop planter in which ideal down force is being applied.
Figure 2:
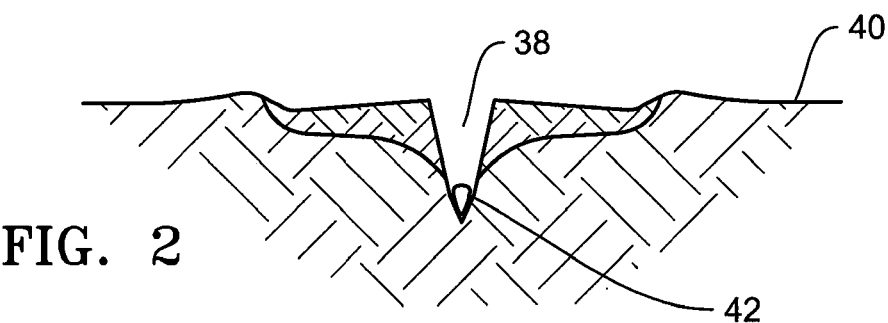
FIG. 2 illustrates the soil profile of FIG. 1 after the seed is deposited and prior to the furrow being covered with soil by the furrow closing assembly.
Figure 3:
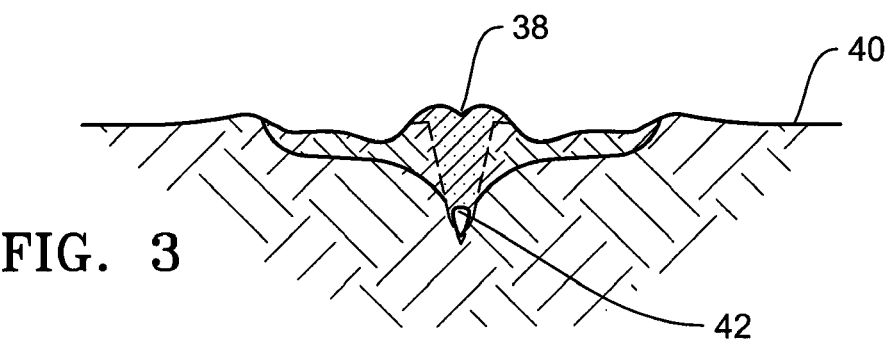
FIG. 3 illustrates the soil profile of FIG. 2 after the furrow is covered with soil by the furrow closing assembly.
Figure 4:
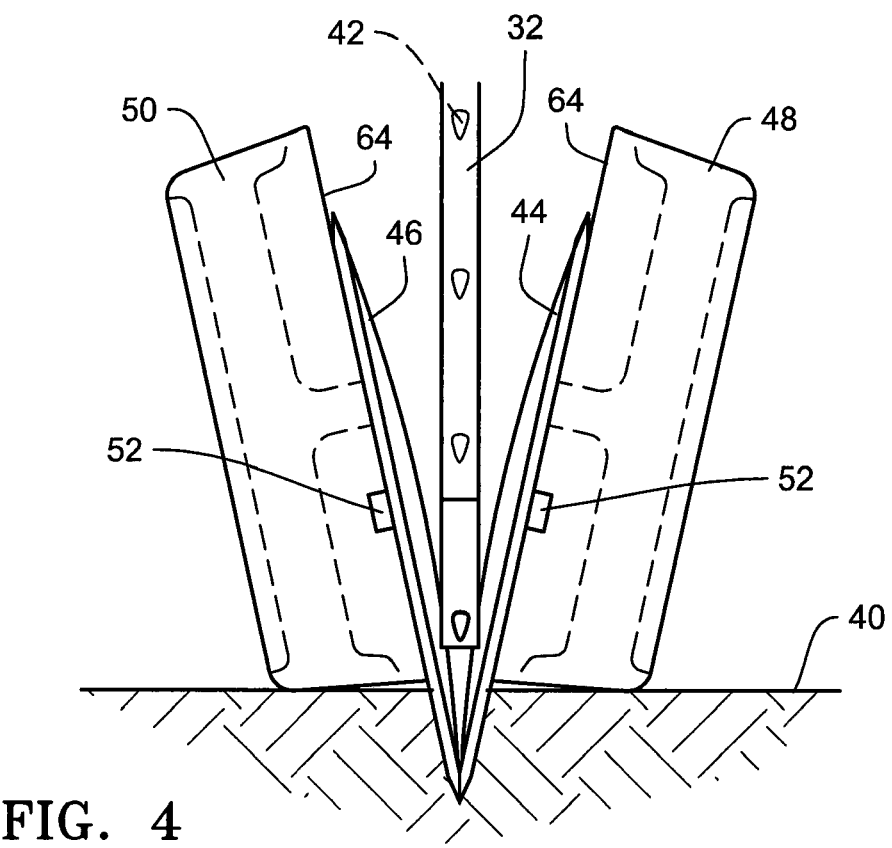
FIG. 4 represents a soil profile under a furrow opening assembly of a conventional row crop planter in which too little down force is being applied.
Figure 5:
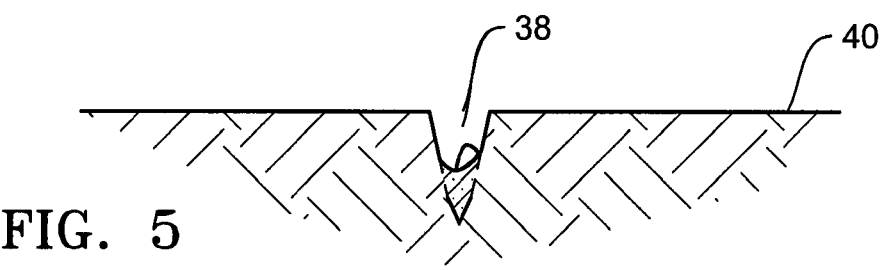
FIG. 5 illustrates the soil profile of FIG. 4 after the seed is deposited and prior to the furrow being covered with soil by the furrow closing assembly.
Figure 6:
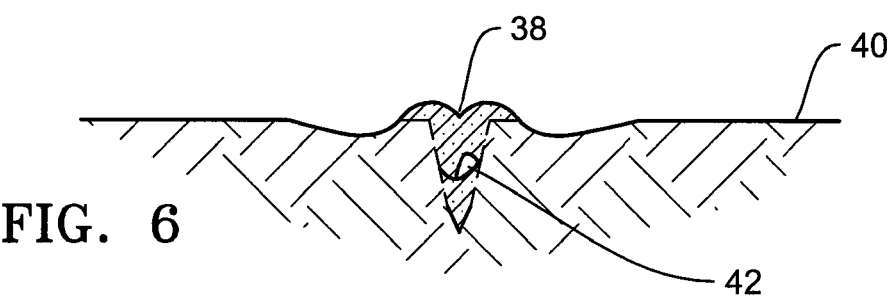
FIG. 6 illustrates the soil profile of FIG. 5 after the furrow is covered with soil by the furrow closing assembly.
Figure 7:
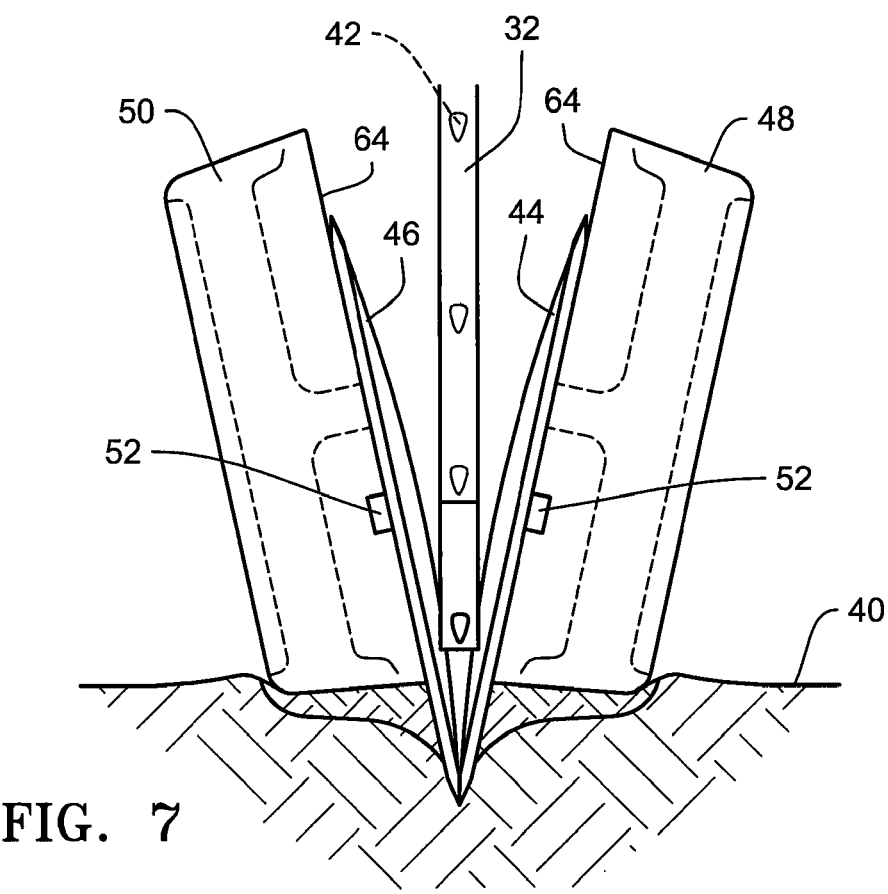
FIG. 7 represents a soil profile under a furrow opening assembly of a conventional row crop planter in which excess down force is being applied.
Figure 8:
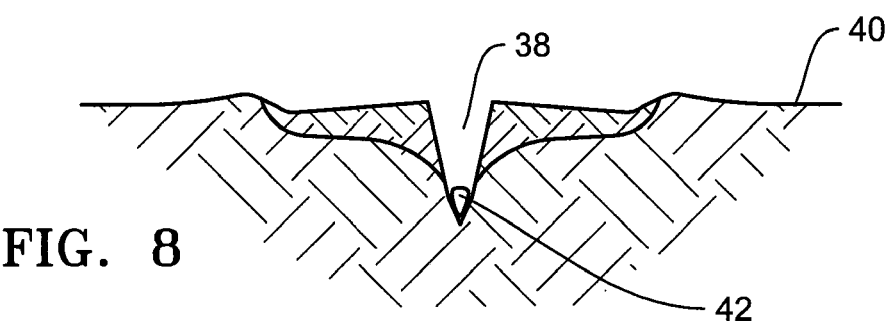
FIG. 8 illustrates the soil profile of FIG. 7 after the seed is deposited and prior to the furrow being covered with soil by the furrow closing assembly.
Figure 9:
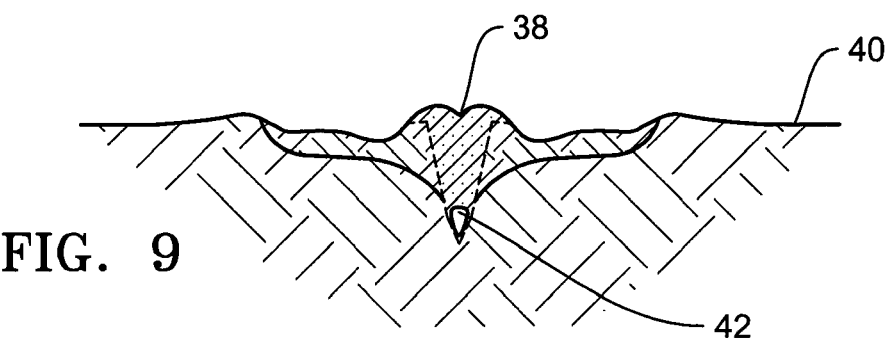
FIG. 9 illustrates the soil profile of FIG. 8 after the furrow is covered with soil by the furrow closing assembly.

Referring to FIGS. 1 and 11, the furrow opening assembly 34 typically includes a pair of flat furrow opening disk blades 44, 46 and a pair of gauge wheels 48, 50. The disk blades 44, 46 are rotatably supported on shafts 52 mounted to a shank 54 depending from the subframe 24. The disk blades 44, 46 are canted such that the outer peripheries of the disks come in close contact at the point of entry 56 into the soil and diverge outwardly and upwardly away from the direction of travel of the planter as indicated by the arrow 58. Thus, as the planter 10 is drawn through the field, the furrow opening disks 44, 46 cut the V-shaped furrow 38 through the soil surface 40 as previously described.

Figure 12:
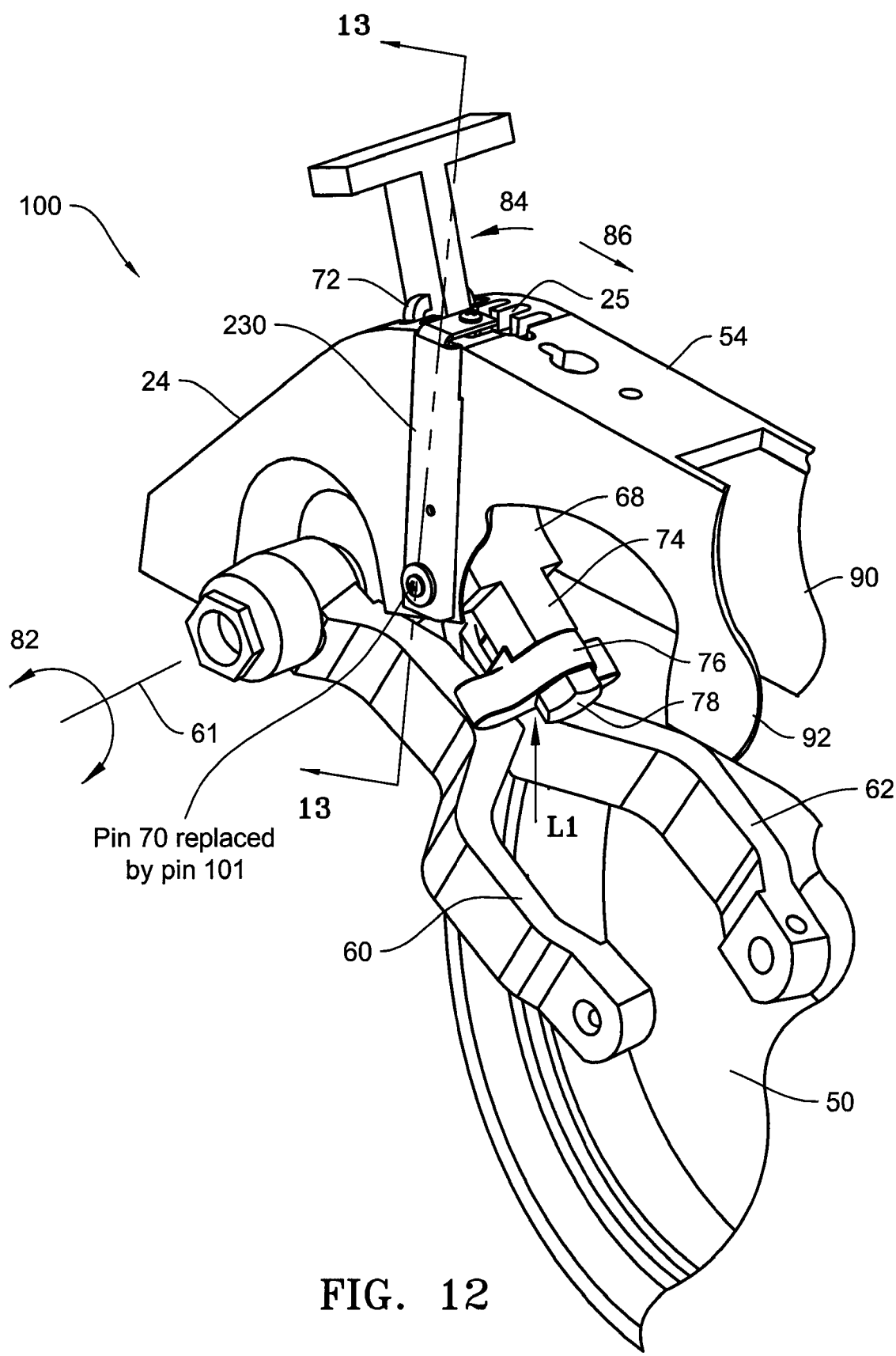
FIG. 12 is a partial perspective view of the gauge wheel height adjustment mechanism of the row unit of FIG. 11 and showing one embodiment of the system of the present invention installed on the row unit.

As best illustrated in FIGS. 11 and 12, gauge wheel arms 60, 62 pivotally support the gauge wheels 48, 50 from the subframe 24 about a first axis 61. The gauge wheels 48, 50 are rotatably mounted to the forwardly extending gauge wheel arms 60, 62 at a second axis 63. The gauge wheels 48, 50 are slightly larger in diameter than the disk blades 44, 46 such that the outer peripheries of the disk blades rotate at a slightly greater velocity than the gauge wheel peripheries. Each of the gauge wheels 48, 50 includes a flexible lip 64 (FIG. 1) at its interior face which contacts the outer face of the respective disk blade 44, 46 at the area 66 (FIG. 11) where the disk blades exit the soil. It should be appreciated that as the opening disks 44, 46 exit the soil after slicing the V-shaped furrow 38, the soil will tend to adhere to the disk, which, if not prevented, would cause the furrow walls to be torn away as the disk rotates out of the soil causing poor furrow formation and/or collapse of the furrow walls, resulting in irregular seed planting depth. Thus, as best illustrated in FIGS. 1 and 11, to prevent the furrow walls from being torn away by the disks exiting the soil, the gauge wheels 48, 50 are positioned to compact the strip of soil adjacent to the furrow while at the same time serving to scrape against the outer face of the disks 44, 46 to shear off any soil buildup as the disks exit the soil. Accordingly, the opening disks 44, 46 and the gauge wheels 48, 50 cooperate to firm and form uniform furrow walls at the desired depth.

As is well understood by those of ordinary skill in the art, a depth adjustment mechanism, is used to set the relative distance between the bottom of the opening disks 44, 46 and the bottom surface of the gauge wheels 48, 50, thereby establishing the depth of penetration of the opener disks 44, 46 into the soil surface. The term "gauge wheels" may be used interchangeably throughout this specification with "depth regulation member." Thus any recitation in this specification of such terms are to be understood as including any type of depth regulating member, whether gauge wheels, skis, skids, runners, etc.

Accordingly, in the conventional John Deere MaxEmerge planters, for example, to vary the depth of the seed furrow 38, the gauge wheels 48, 50 are vertically adjustable relative to the furrow opening disk blades 44, 46 by a height adjusting arm 68 pivotally supported from the subframe 24 by a pin 70 (FIG. 11). An upper end 72 of the height adjusting arm 68 is selectively positionable along the subframe 24. As best illustrated in FIG. 12, a rocker 76 is loosely pinned to the lower end 74 of the height adjusting arm 68 by a pin or bolt 78. As best illustrated in FIG. 12, the rocker 76 bears against the upper surfaces of the pivotable gauge wheel arms 60, 62, thereby serving as a stop to prevent the gauge wheel arms 60, 62 from pivoting counterclockwise about the first pivot axis 61 as indicated by arrow 82. Thus, it should be appreciated that as the upper end 72 of the height adjusting arm 68 is selectively positioned, the position of the rocker/stop 76 will move accordingly relative to the gauge wheel arms 60, 62. For example, referring to FIG. 12, as the upper end 72 of the height adjusting arm 68 is moved in the direction indicated by arrow 84, the position of the rocker/stop 76 will move upwardly away from the gauge wheel arms 60, 62, allowing the gauge wheels 48, 50 to move vertically upwardly relative to the furrow opening disk blades 44, 46 such that more of the disk blade will extend below the bottom of the gauge wheels 48, 50, thereby permitting the furrow opening disk blades 44, 46 to penetrate further into the soil. Likewise, if the upper end 72 of the height adjusting arm 68 is moved in the direction indicated by arrow 86, the rocker/stop 76 will move downwardly toward the gauge wheel arms 60, 62, causing the gauge wheels 48, 50 to move vertically downwardly relative to the furrow opening disk blades 44, 46, thereby shortening the penetration depth of the disk blades into the soil. When planting row crops such as corn and soybeans, the position of the rocker/stop 76 is usually set such that the furrow opening disk blades 44, 46 extend below the bottom of the gauge wheels 48, 50 to create a furrow depth between one to three inches.

In addition to serving as a stop as previously described, the loosely pinned rocker 76 serves the dual function of "equalizing" or distributing the load carried by the two gauge wheels 48, 50, thereby resulting in more uniform furrow depth. It should be appreciated that during planting operations, substantially the entire live and dead load of the row unit 12 along with the additional down-force exerted by the down-pressure springs 18 will be carried by the gauge wheels 48, 50 after the opening disks 44, 46 penetrate the soil to the depth where the gauge wheel arms 60, 62 encounter the preselected stop position of the rocker 76. This load, represented by arrow L1 (FIG. 12), is transferred by the bolt 78 through the rocker 76 to the gauge wheel arms 60, 62. This entire load is carried as well by the pin 70 which supports the depth adjustment link 68 relative to the row unit shank 54.

Referring to FIG. 11, the vertical loads carried by the gauge wheels 48, 50 include, including the dead load of the opener disk assembly 34 (including opener discs 44, 46 and gauge wheels 48, 50), the front mounting bracket 20, the hopper support beam 22, seed hopper 26, insecticide hopper 28, seed meter 30, seed tube 32, and the mass of any other attachments or devices supported on the row unit 12. In addition, the gauge wheels 48, 50 carry all the live loads corresponding to the mass of the seed and insecticide stored within the hoppers 26, 28 and the supplemental downforce applied by the biasing means 18. To achieve a static load balance all of the dead loads and live loads are resisted primarily by the reactionary force exerted by the soil against the opener disks 44, 46, the gauge wheels 48, 50.

Figure 13:
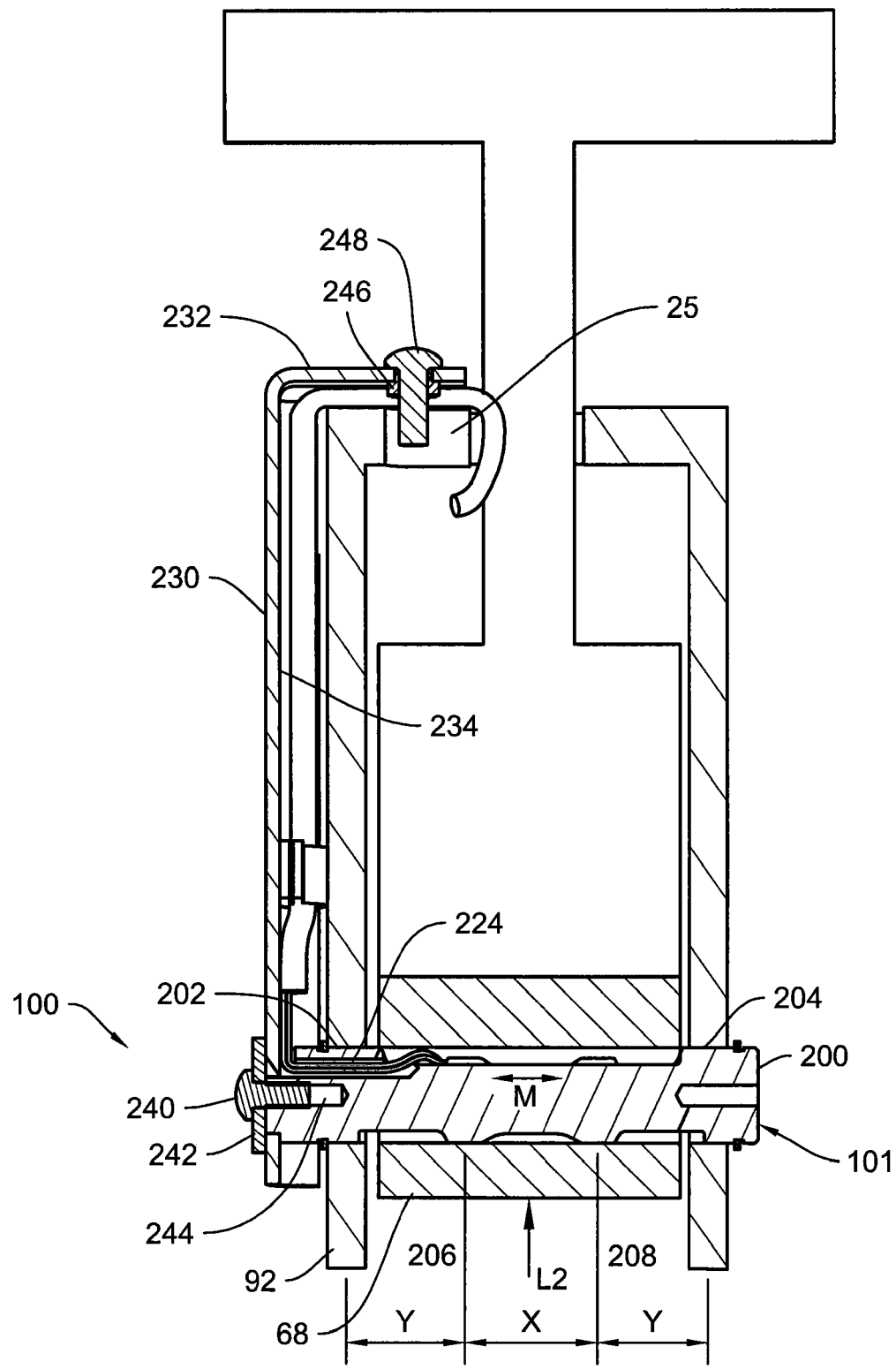
FIG. 13 is a partial cross-sectional view of the embodiment of FIG. 12 as viewed along lines 13-13 of FIG. 12.

Referring to FIGS. 12 and 13, the load L2 carried by the pin 70 is proportional to the load L1 (FIG. 12) as determined by the geometry of the depth adjustment mechanism. Likewise the load L1 is proportional to the reactionary force exerted by the soil on the gauge wheels 48, 50. The pin 70 is loaded in shear between the left side panel 90 and right side panel 92 of the row unit shank 54. While this provides a distinct location to reliably measure the down force, there are three distinct challenges in measuring this load. First, the pin 70 is free to rotate during operation, which makes the routing of wires from a sensor disposed on the pin to remote processing circuitry difficult. Second, the pin 70 is loaded in pure shear at either end of the pin 70. Shear loads are difficult to measure. Third, the area surrounding the pin 70 is subject to large amounts of debris and trash during planting operations and to the relative motion of the surrounding gauge wheel arms and gauge wheels.

The system 100 of the present invention overcomes the foregoing challenges and provides the ability to accurately determine and monitor the downforce during planting operations by ensuring that the load being sensed acts at substantially the same known and consistent location no matter what the position of the depth adjustment mechanism and/or the depth regulating member.

Figure 17:
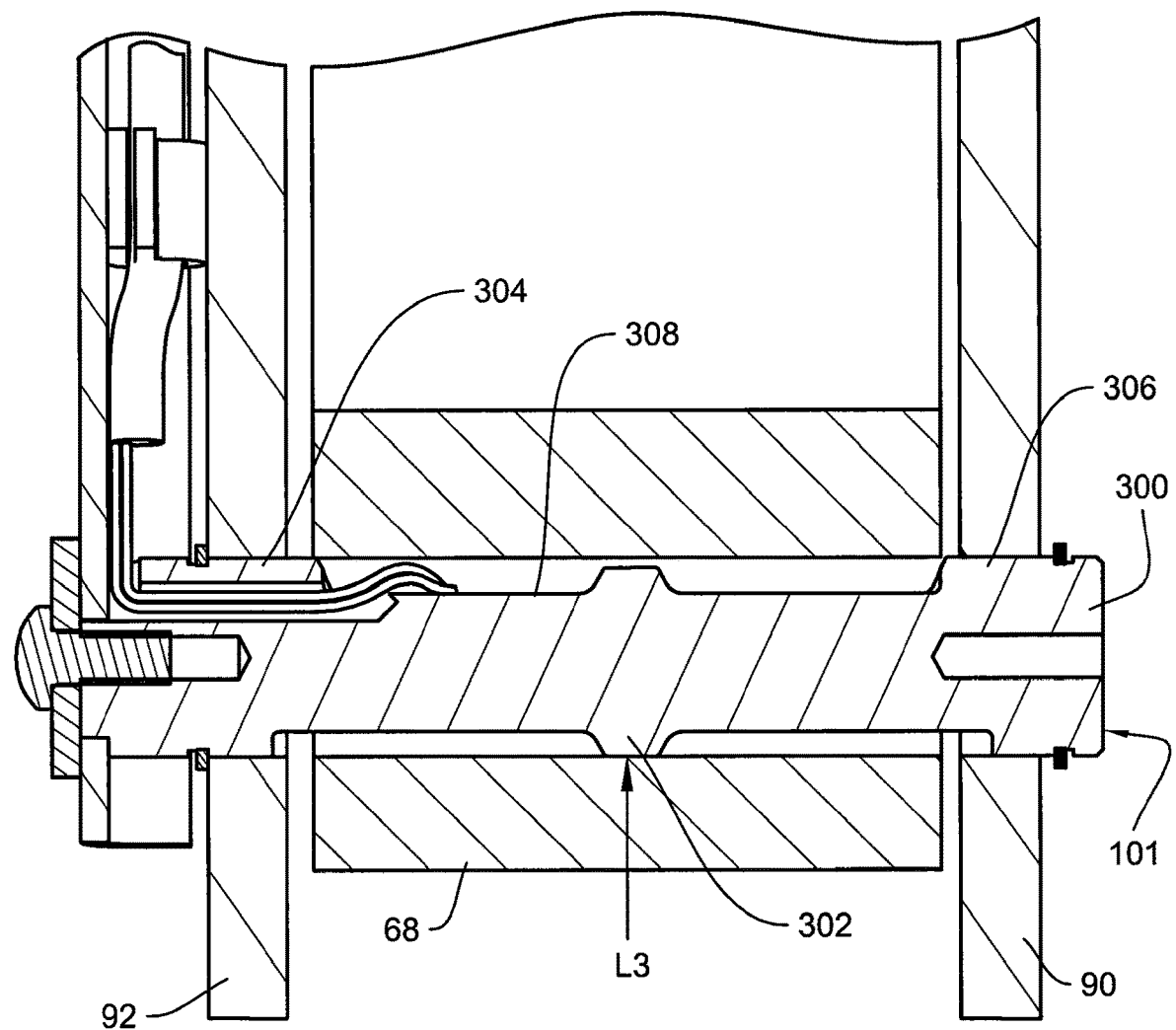
FIG. 17 illustrates a cross-sectional view of another embodiment of the system of the present invention showing an alternative embodiment of a 3-point load sensing pin and a rotational restraint arm.
Figure 20:
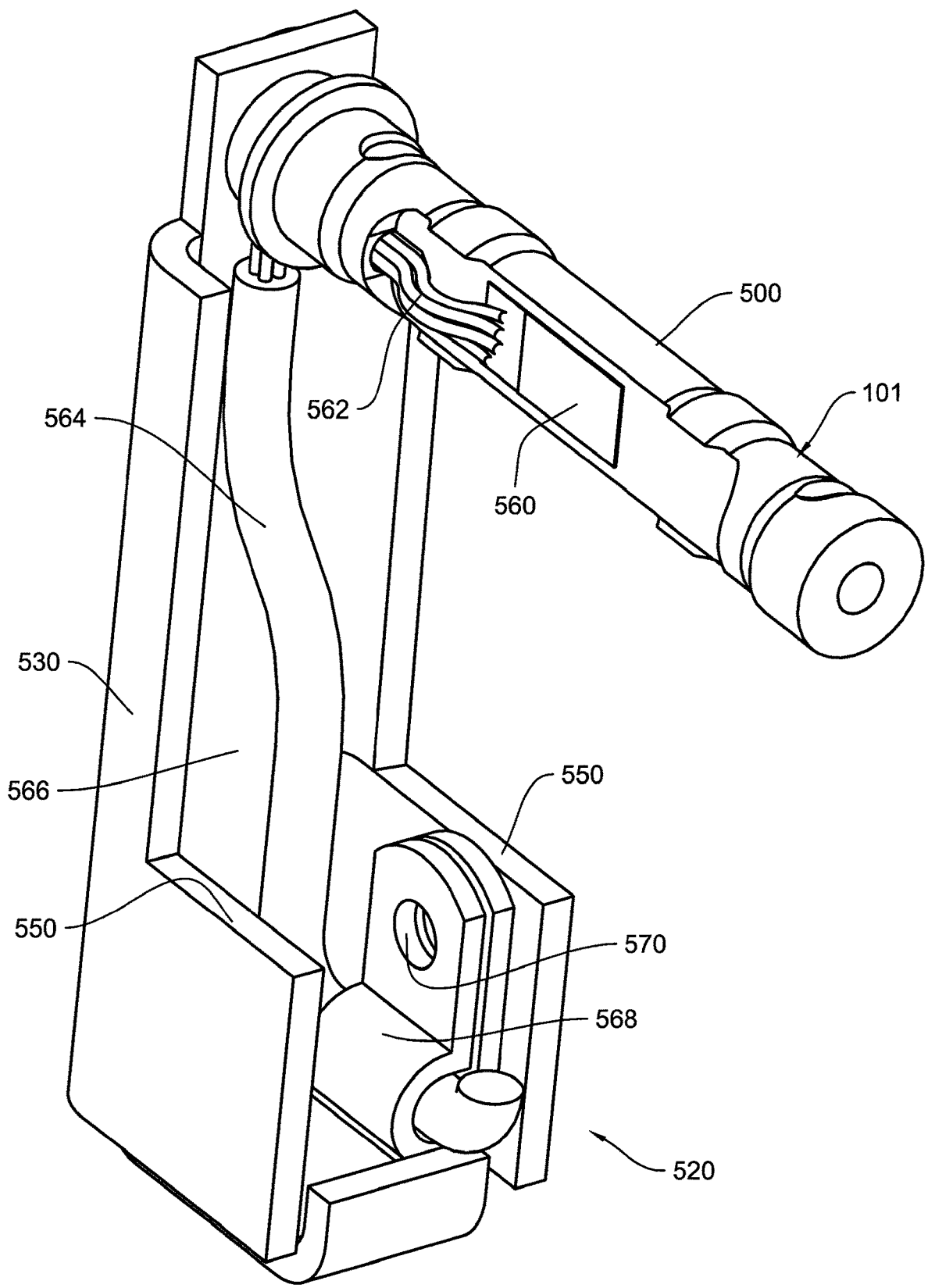
FIG. 20 is a perspective view of the embodiment of the system of the present invention illustrated in FIG. 19 showing another embodiment of a 4-point load sensing pin and a rotational restraint arm.

To the accomplishment of the foregoing, in the preferred embodiment of the system 100, the pin 70 is replaced with a load sensing pin 101. Different embodiments of the load sensing pin 101 are illustrated in FIGS. 13, 17 and 20. In the embodiment of FIG. 13, the load sensing pin 101 provides four bearing points (discussed below), and is hereinafter referred to as a "4-point pin" 200. In the embodiment of FIG. 17, the load sensing pin 101 provides three bearing points (discussed later), and is hereinafter referred to as a "3-point pin" 300. Naturally, other load sensing pin embodiments may be equally suitable. Accordingly, the system 100 of the present invention should not be construed as being limited to any particular load sensing pin embodiment, it being desirable, however, that the design of the load sensing pin 101 is one that can be accurately and relatively easily machined in high production, such as on a CNC machine, so as to minimize manufacturing costs.

Figure 14:
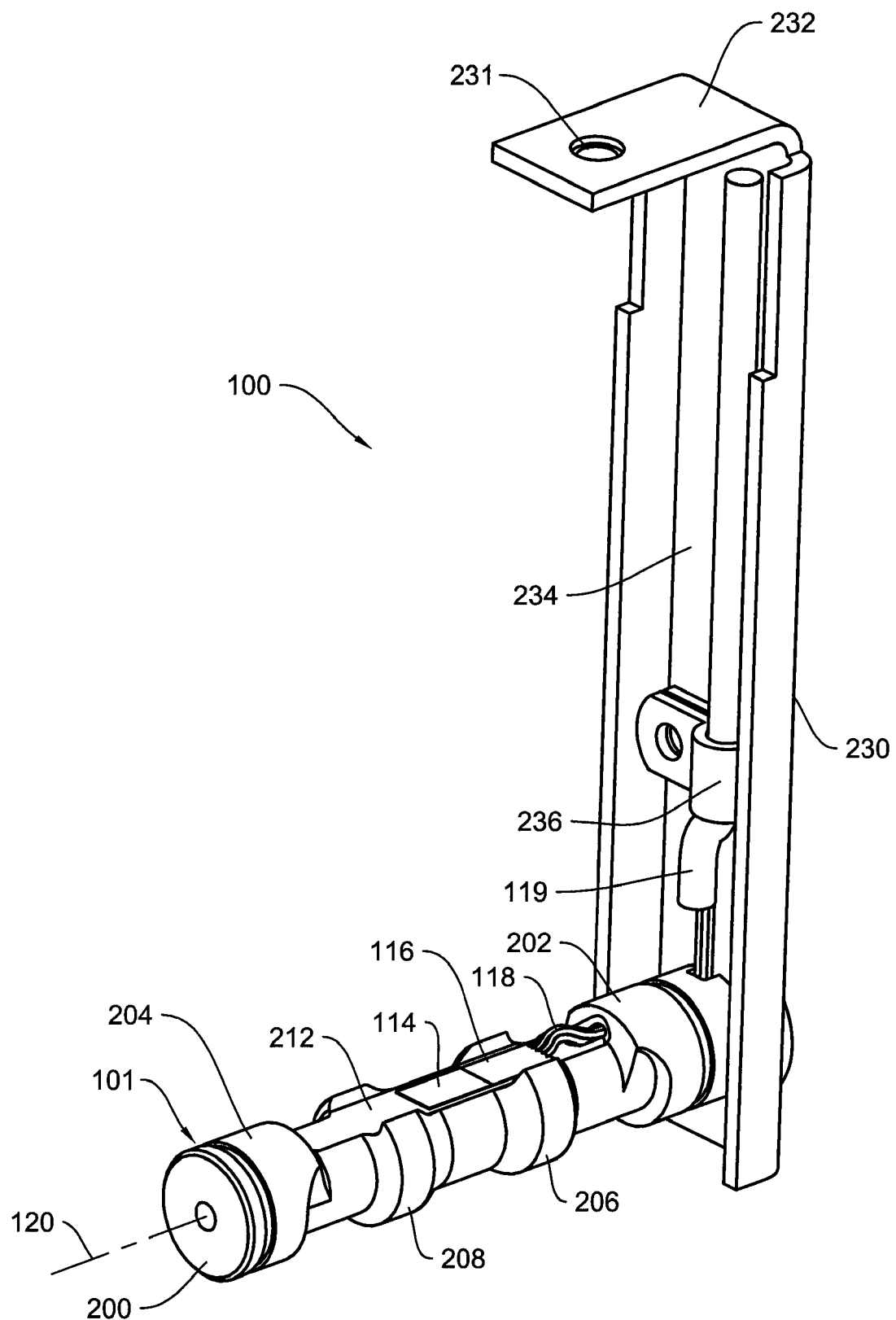
FIG. 14 is a perspective view of the embodiment of the system of the present invention illustrated in FIGS. 12 and 13 showing one embodiment of a 4-point load sensing pin and a rotational restraint arm.
Figure 15:
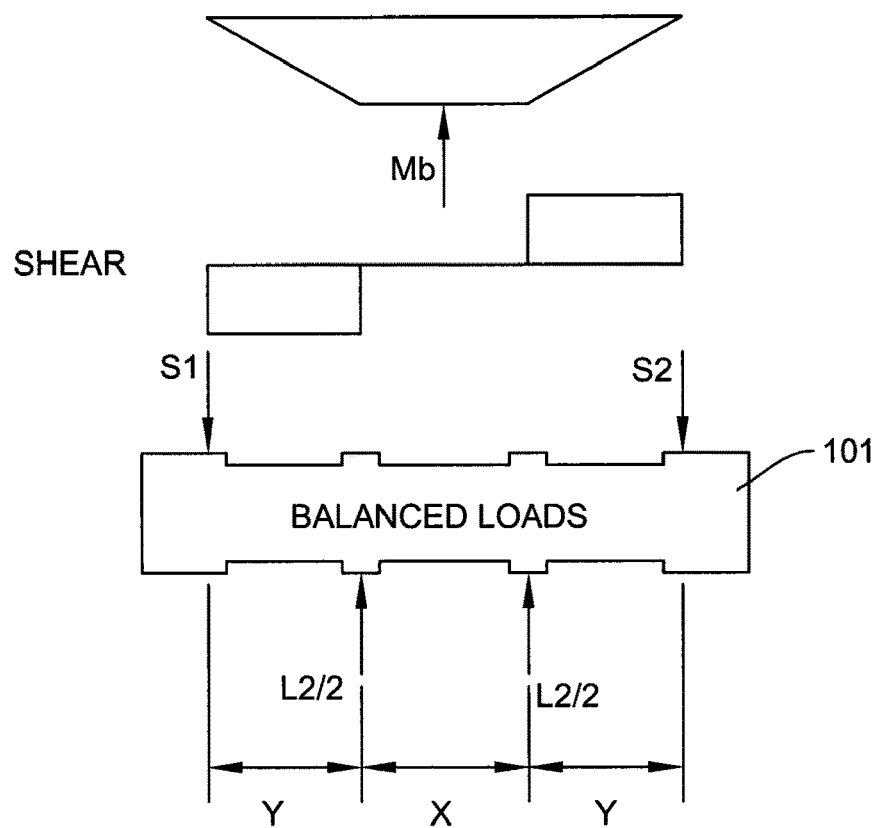
FIG. 15 is a shear and bending moment diagram of the load sensing pin of FIG. 14 under a balanced load.

Referring to FIG. 13 and FIG. 14, the 4-point pin 200 is provided with right and left shoulders 202, 204 for support from the right and left side panels 90, 92 of the row unit shank 54. Two intermediate lobes 206, 208 are separated by a distance X in the center of the pin 200 and spaced symmetrically from the shoulders 202, 204 by a distance Y. The load L2 is transferred from the height adjusting arm 68 bearing against these two lobes 206, 208. The load L2 is subsequently transferred from the 4-point pin 200 to each of the shoulders 202, 204 such that the load at the bearing points on the left and ride side panels 90, 92 is approximately half of the load L2. By the nature of the design of the row unit, any appreciable load L2 will always act in the direction shown in FIG. 13. The shear/bending moment diagram for 4-point pin 200 can easily be calculated and is shown in FIG. 15. Thus, the advantage of the pin 200 is that regardless of where a given load L2 is applied to height adjusting arm 68, the resultant bending stress Fb at the center of the pin 200 is equivalent.

For example, FIG. 15 illustrates the 4-point pin 200 with a total balanced load L2, acting equally as L2/2 on each lobe 206, 208. This balanced load results in equal and opposite reactionary forces S1, S2 acting on shoulders 202, 204. In the preferred embodiment of the 4-point pin, the distance X is approximately ⅞ inch and the distance Y is approximately $^{13}/_{16}$ inch. Thus, assuming that load L2 equals 1000 pounds, the reactionary forces S1, S2 will equal 500 pounds each. The shear and bending moment diagrams are illustrated in FIG. 15 for this loading condition. The peak bending moment (Mb) acting at the lobes 206, 208 can thus be calculated by determining the area under the shear diagram (i.e., Mb=500×$^{13}/_{16}$=406 in-lbs), which remains uniform between the two lobes 206, 208. Once the bending moment Mb has been determined at the desired point on the 4-point pin 200, the bending stress Fb can be easily calculated from the formula Fb=Mb/S, where S is the section modulus of the 4-point pin 200 at that desired point.

Figure 16:
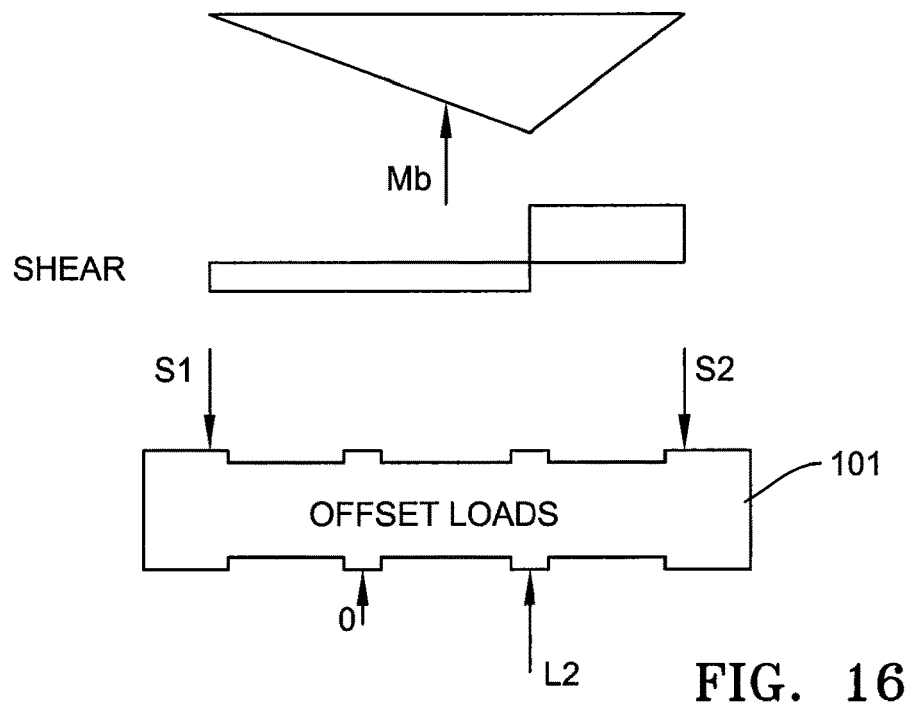
FIG. 16 is a shear and bending moment diagram of the load sensing pin of FIG. 14 under an offset load.

In another example as illustrated in FIG. 16, the same 4-point pin 200 is shown but in this example the 1000 pound load L2 is offset from the center line of the 4-point pin 200 and is instead applied in line with lobe 208. The corresponding shape of the shear and bending moment diagrams are illustrated. It should be understood that these graphs are not to scale but the calculations are well understood by those skilled in the art. As such, in this example, the reaction force R1 acting at left shoulder 204 equals 325 lbs and the reaction force R2 acting at the right shoulder 202 equals 675 lbs. Continuing to refer to FIG. 16, it should be appreciated that the peak bending moment (Mb) in this example does not occur at the center of the 4-point pin 200 as in the previous example, but instead occurs at the lobe 208. However, as long as the load sensor is placed at the center of the 4-point pin 200, the bending moment (Mb) at that point is the only moment of interest. In this example, calculating the bending moment (Mb) at the center of the 4-point pin 200 yields a bending moment of 406 in-lbs (i.e., 325×($^{13}/_{16}$+(⅞÷2))=406), which is identical to the bending moment of the balanced load of the previous example illustrated in FIG. 15. As such, the system 100 of the present invention is capable of accurately measuring a load regardless of the location the load is acting along the length of the pin 200. This feature is advantageous in that some planters are not equipped with a rocker or equalizer 76 as shown in FIG. 12 but rather have a depth adjustment mechanism which utilizes a single casting with two fixed lobes (not shown) to support left and right gauge wheel arms 60, 62 independently. In this situation the load on right and left sides are rarely equal and the resultant load L2 will not act at the center of the load sensing pin 101. Thus, in accordance with the present invention the shear load is simply resolved to a bending stress Fb at the center of a load sensing pin 101.

It is known that strain gauges can be used to determine the strain in an object subjected to bending stresses by measuring the changes in resistance of the strain gauge (discussed later). Thus, in the preferred embodiment of the system 100, a strain gauge transducer 114 is provided along with appropriate circuitry, including processors and signal conditioners, etc., as recognized by those of skill in the art, to determine the strain resulting from the load L2 and thus the corresponding downforce being exerted on ground surface by the gauge wheels.

Heretofore the discussion of the design of the load sensing pin 101 and bending stress calculations have been in terms of the longitudinal axis of the load sensing pin 101. However, it should be appreciated the location of the strain gage 114 in terms of its distance from the neutral axis of the pin relative to the load L2 is also important. For example, when a beam is subjected to bending, the strain at the surface of the beam is a function of the distance from the neutral axis of the beam. Additionally, the stain will vary depending on the direction and location of the load with respect to that surface. For the preferred load sensing pin 101, the "beam" is generally circular in cross section. Thus, if a strain gauge was applied to the curved outer surface of the load sensing pin 101, then variation in the radial location of the strain gauge would contribute to inaccuracy of the measured strain and thus the load acting on the load sensing pin 101. For example, if the load sensing pin 101 were allowed to rotate freely about its longitudinal axis 120 and the strain gauge 114 was at the front or rear of the pin (along the neutral axis relative to load L2), then the measured strain (and correspondingly the stress) would be near zero.

Accordingly, in the preferred embodiment, the system comprises a 4-point pin assembly 220 comprising the 4-point pin 200 and a restraint 230. In the preferred embodiment, a flat surface 112 is provided on the 4-point pin 200 directly opposite the application of the load L2 and this orientation is preferably maintained by the restraint 230 which restricts the ability of the 4-point pin 200 to rotate about its longitudinal axis 120. As a result, the bending stress (Fb) will be substantially constant across the surface and accurate measurements are therefore not as dependent upon highly accurate placement of the strain gage 114.

Referring again to FIGS. 12, 13 and 14, the restraint 230 is preferably a rigid member fixedly secured to the 4-point pin 200, such as by welding, threaded connection, snap rings, or other suitable means recognized by those skilled in the art, and is preferably configured to easily mount to the shank 54 with little or no modification to the shank 54. Thus, in the preferred 4-point pin assembly 220, the restraint 230 is fixedly secured at one end to the 4-point pin 200 by a screw 240 and washer 242 threaded into a tapped hole 244 in the end of the pin 200. The top end 232 of the restraint 230 is preferably restrained relative to the shank 54 by a bolt or screw 248 threadably received into a weld-nut 146 and which extends into one of the plurality of slots 25 in the shank 54 into which the height adjustment arm 68 is selectively movable to permit adjustment of the furrow depth. In the preferred embodiment the screw 248 preferably extends into the forward most slot 25 such that depth adjustment will generally not be compromised.

FIG. 14 best illustrates the preferred system by which the load sensor 114 is connected to the processing circuitry previously referenced. In the preferred embodiment, the strain gage 114 is preferably connected to a flexible tape 116 which is in turn connected to wires 118. The wires 118 are preferably routed through a longitudinal bore 224 in the pin 200 and then upwards along the inner surface 234 of the restraint 230 through a conduit or sheath 219 preferably fastened to the restraint 230, such as by a P-clip 236 or other suitable connection. The wire 118 is then preferably routed along the outside of the shank 54 until it reaches a convenient point to enter the interior of the shank 54, such that it is protected from debris.

Figure 22:
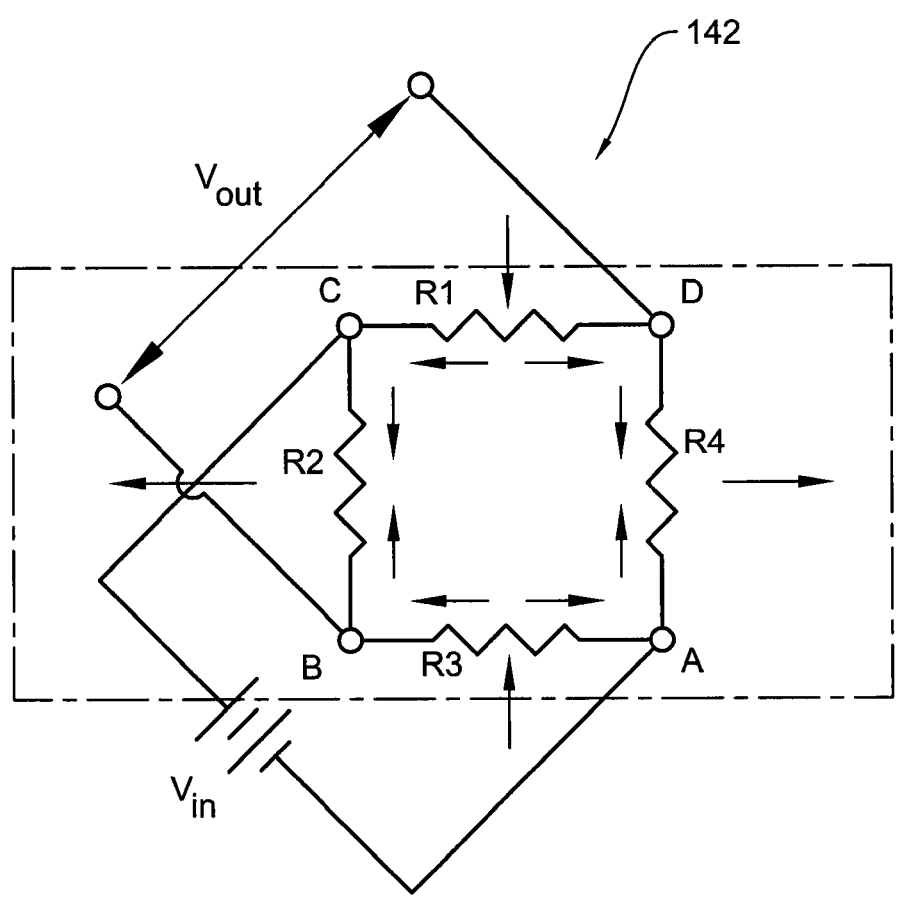
FIG. 22 is a schematic of one embodiment of a preferred strain gauge transducer used in connection with the load sensing pin system of the present invention.

The preferred strain gage transducer is illustrated in FIG. 22 and preferably comprises four strain gage elements R1, R2, R3, R4 electrically connected to form a balanced Wheatstone bridge circuit 142 such that in an unloaded condition (i.e., the gauge wheel arms 60, 62 are not in contact with the height adjustment arm 68) when a voltage (Vin) is applied between points A and C, the output voltage between points B and D will show no potential difference. Thus, R1/R2=R4/R3, and, therefore Vout equals zero. With a balanced bridge circuit 142, any small change in the resistance of the sensing grid caused by the change in strain will throw the bridge circuit 142 out of balance producing an output voltage (Vout). The output voltage (Vout) is expressed in millivolts output per volt input (Vin).

Thus, in use, the bridge circuit 142 will measure the minute changes in resistance corresponding to the strain experienced by the load sensing pin 101 as previously described resulting from the bending stress Fb exerted by the bending moment Mb. In the preferred four-element Wheatstone bridge, two strain gages are wired in compression and two in tension. In FIG. 22, R1 and R3 are in tension (positive) and R2 and R4 are in compression (negative). The total strain, or output voltage of the circuit (Vout) is equivalent to the difference between the voltage drop across R1 and R4. This expression is written as:

$$Vout=Vin$$

The load sensing pin 101 preferable provides sufficient accuracy without factory or field calibration. The tolerances of machining for this pin are generally sufficient enough that the strain gage will be accurate enough for this application without calibration. If for some reason an extremely accurate load measuring capability was desired, the capability to calibrate the measurement system could be readily provided. This linear correlation of the output voltage to known loads could be programmed into a microcontroller of the processing circuitry for monitoring and/or displaying the loads to the grower in the cab of the tractor and/or to automatically regulate the down force during planting operations.

Preferably, as is well known in the art, such processing circuitry is coupled to the planter's hydraulic or pneumatic system to automatically regulate the downforce applied to the row units based on any one or more of the foregoing data values in which the detected down force is deemed too low or too high thereby automatically maintaining the appropriate amount of downforce on the row unit as the planter traverses the field.

As previously identified, FIG. 17 illustrates a partial cross section view of an alternative embodiment of the load sensing pin 101 providing three bearing surfaces (i.e. a 3-point pin 300) comprising a center lobe 302 and left and right shoulders 304, 306. In this embodiment the load L2 from the height adjustment arm 68 bears against the center lobe 302. The strain gage 114 in this embodiment is applied at a location on one side of the center lobe. It should be appreciated that this 3-point pin 300 will function in substantially the same manner as the 4-point pin 200 except that the height adjustment arm 68 is not as well supported without a rocker/equalizer 76 so minor load measurement inaccuracies may result.

To this point all discussion of the application of the present invention has been applied to John Deere row units 10. Other row units 400 are commonplace such as those shown in FIG. 18 as manufactured by Kinze. In many regards the operation of these row units 400 is similar to that of the Deere row units 10 except for the means of adjusting the planting depth. In the Kinze row units 400, opening disks 444, 446 are supported from the row unit shank 402 and gage wheels 448, 450 are supported by gage wheel arms 404,406. In order to regulate planting depth, the rotation of the arms 404, 406 about their mounting axis 408 is restrained. The arms 404, 406 are typically a casting provided with an opposing end 410, 412 containing sockets 414, 416. The sockets 414, 416 receive a toggle link 418 containing a left end 420 and a right end 422. The end 422 is received by the socket 414 of the right arm 404. The toggle link 418 is constrained through a linkage comprising a loop 430, a pin 432, and an arm 434. The arm 434 is secured at its bottom end 436 through a spacer 438 which is bolted into the shank 402. The top end 446 of the arm 434 can be selectively positioned within slots 442 of the shank cover 444 as a means of regulating the planting depth. During planting operation, the toggle link 418 will experience loads L4, L5 from the arms 404,406.

Figure 21:
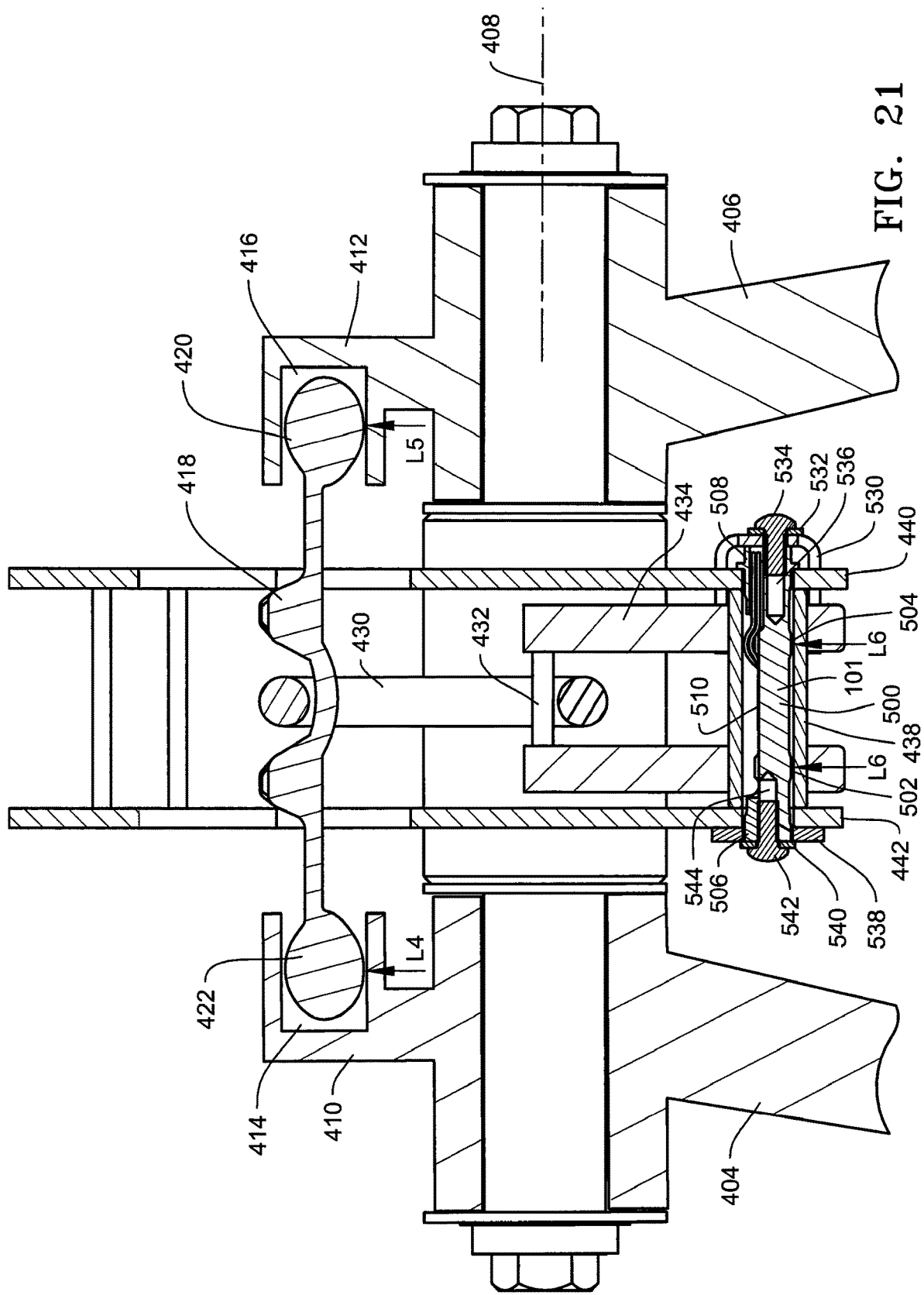
FIG. 21 is a partial cross section view of the embodiment of FIGS. 19 and 20 as viewed along lines 21-21 of FIG. 19.

FIG. 21 shows the preferred embodiment of the present invention as adapted for use within the row unit 400. The spacer 438 is still utilized but instead of being bolted into the row unit shank 402, the bolt has been replaced by the load sensing pin 101 of the present invention. In order to accurately measure the load, the pin 101 must not place an axial load upon the shank panels 440, 442 and the spacer 438 must be allowed relative freedom of movement such that all loads are transferred to the load sensing pin 101. In this embodiment, the load sensing pin 500 is again preferably provided with two lobes 502, 504 upon which the loads from the depth adjustment linkage are born. The pin 500 is supported at two shoulders 506, 508 at either end of the pin 500. A strain gage is located at the center of the pin 510 at a location to maximize its distance from the neutral axis relative to the applied loads L6. The loads L6 will be equal to (L4+L5)/2 as the geometry of this depth adjustment mechanism ensures the loads L6 are equal on each lobe 502, 504.

Figure 19:
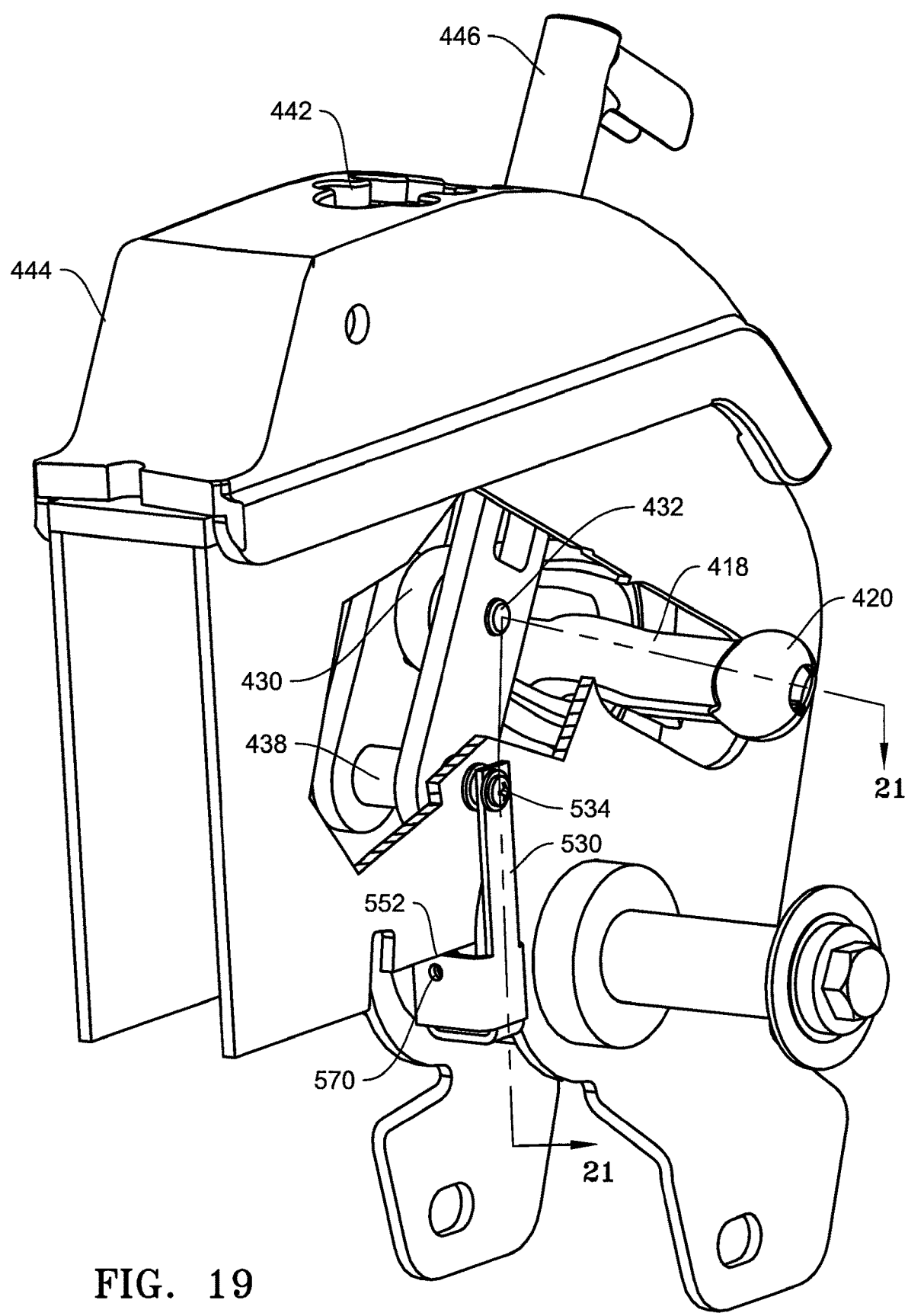
FIG. 19 is a partial front perspective view of the depth adjustment mechanism of the row unit of FIG. 18 showing another embodiment of the system of the present invention using another embodiment of a load sensing pin and rotational restraint arm installed on the row unit.

FIGS. 20 and 21 show a preferred embodiment of the pin assembly 520 which preferably comprises the load sensing pin 500 and a restraint 530 secured thereto by a washer 532 and a screw 534 inserted into a threaded hole 536 in the pin 500. The opposite end of the pin 500 is preferably constrained within the row unit shank 402 by means of a shim 538, washer 540, and screw 542. The thickness of the shim 538 is selectable depending upon the tolerances in the width of the shank 402 in order to ensure that no axial load is placed upon the pin 500 when the screw 542 is fastened into the hole 544. The restraint 530 is preferably provided with edges 550 that locate adjacent to the lower edge 552 of the row unit shank 402 as best seen in FIG. 19. FIG. 19 illustrates a partial view of the row unit assembly 400 wherein the front portion and a portion of the side of the shank have been cut away to allow viewing the internal components of the depth adjustment mechanism. It should be appreciated that rotation of the restraint 530 and thus the pin 500 is prevented by nature of the close proximity of edges 550, 552. The preferred location of the strain gage 560 is shown in FIG. 20 along with wires 562 and sheathed wires 564. The sheathed wires 564 are well protected by being installed adjacent the inner surface 566 of the restraint 530 and fastened securely by a clip 568 which is bolted through the hole 570 in the arm 530.

While all of the above descriptions have been made in the context of a planter row unit, it will be readily realized that the teachings contained herein are applicable to any pin subjected to shear from a load in a single and consistent direction. The methods of restraining rotation, converting shear to bending stress, and routing the wiring will see uses in many applications outside the field of agricultural planting.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural implement, comprising:
a row unit operably supported above a soil surface of a field, said row unit having a furrow opening assembly for opening a furrow in the soil surface as said row unit traverses the field, said row unit further having a subframe;
a depth adjusting mechanism applying a load on said subframe and capable of modifying a depth of the furrow opened by said furrow opening assembly, said depth adjusting mechanism having an adjusting arm and a rocker; and
a load sensor substantially fixedly oriented with respect to said depth adjusting mechanism and disposed to generate a load signal corresponding to said applied load;
processing circuitry in communication with said load sensor, said processing circuitry generating load values corresponding to said load signals; and
a restraint which substantially fixedly orients said load sensor with respect to said depth adjusting mechanism.

2. The agricultural implement of claim 1, wherein said furrow opening assembly comprises:
an opening disk blade disposed to open said furrow; and
a gauge wheel disposed to rollingly contact the soil surface, said gauge wheel limiting said depth of said furrow, wherein said applied load increases as a force between said gauge wheel and said soil surface increases.

3. The agricultural implement of claim 1, wherein a correlation of said load signal to known loads is programmed into a microcontroller of said processing circuitry.

4. The agricultural implement of claim 3, wherein said processing circuitry is configured to automatically regulate downforce as the agricultural implement traverses a field.

5. An agricultural implement, comprising:
a row unit operably supported above a soil surface of a field, said row unit having a furrow opening assembly for opening a furrow in the soil surface as said row unit traverses the field, said row unit further having a subframe;
a depth adjusting mechanism applying a load on said subframe and capable of modifying a depth of the furrow opened by said furrow opening assembly, said depth adjusting mechanism having an adjusting arm and a rocker; and
a load sensor substantially fixedly oriented with respect to said depth adjusting mechanism and disposed to generate a load signal corresponding to said applied load;
processing circuitry in communication with said load sensor, said processing circuitry generating load values corresponding to said load signals; and
wherein said load sensor is substantially rotationally restrained in relation to said depth adjusting mechanism.

6. The agricultural implement of claim 5, wherein said furrow opening assembly comprises:
an opening disk blade disposed to open said furrow; and
a gauge wheel disposed to rollingly contact the soil surface, said gauge wheel limiting said depth of said furrow, wherein said applied load increases as a force between said gauge wheel and said soil surface increases.

7. The agricultural implement of claim 5, wherein a correlation of said load signal to known loads is programmed into a microcontroller of said processing circuitry.

8. The agricultural implement of claim 7, wherein said processing circuitry is configured to automatically regulate downforce as the agricultural implement traverses a field.

9. An agricultural implement, comprising:
a row unit operably supported above a soil surface of a field, said row unit having a furrow opening assembly for opening a furrow in the soil surface as said row unit traverses the field, said row unit further having a subframe;
a depth adjusting mechanism applying a load on said subframe and capable of modifying a depth of the furrow opened by said furrow opening assembly, said depth adjusting mechanism having an adjusting arm and a rocker; and
a load sensor substantially fixedly oriented with respect to said depth adjusting mechanism and disposed to generate a load signal corresponding to said applied load;
processing circuitry in communication with said load sensor, said processing circuitry generating load values corresponding to said load signals; and
a restraint which substantially rotationally restrains said load sensor with respect to said depth adjusting mechanism.

10. The agricultural implement of claim 9 wherein said furrow opening assembly comprises:
an opening disk blade disposed to open said furrow; and
a gauge wheel disposed to rollingly contact the soil surface, said gauge wheel limiting said depth of said furrow, wherein said applied load increases as a force between said gauge wheel and said soil surface increases.

11. The agricultural implement of claim 9, wherein a correlation of said load signal to known loads is programmed into a microcontroller of said processing circuitry.

12. The agricultural implement of claim 11, wherein said processing circuitry is configured to automatically regulate downforce as the agricultural implement traverses a field.

13. An agricultural implement, comprising:
- a row unit operably supported above a soil surface of a field, said row unit having a furrow opening assembly for opening a furrow in the soil surface as said row unit traverses the field, said row unit further having a subframe;
- a depth adjusting mechanism applying a load on said subframe and capable of modifying a depth of the furrow opened by said furrow opening assembly, said depth adjusting mechanism having an adjusting arm and a rocker; and
- a load sensor substantially fixedly oriented with respect to said depth adjusting mechanism and disposed to generate a load signal corresponding to said applied load; processing circuitry in communication with said load sensor, said processing circuitry generating load values corresponding to said load signals; and
- wherein said depth adjusting mechanism is pivotally joined to said subframe by a pin, said applied load transferred between said depth adjusting mechanism to said subframe by said pin.

14. The agricultural implement of claim 13, further comprising:
- an opening disk blade disposed to open said furrow; and
- a gauge wheel disposed to rollingly contact a soil surface, said gauge wheel limiting said depth of said furrow, wherein said load increases as a force between said gauge wheel and said soil surface increases, and
- wherein pivotal adjustment of said depth adjusting mechanism about said pin modifies a maximum height of said gauge wheel relative to said opening disk blade.

* * * * *